United States Patent
Giotto et al.

(10) Patent No.: US 7,192,194 B2
(45) Date of Patent: Mar. 20, 2007

(54) UNIVERSAL ADAPTER FOR FIBER OPTIC CONNECTORS

(76) Inventors: Frank Giotto, 3823 Mohawk St., New Hartford, NY (US) 13413; Raymond Joseph Wertz, 77 Clinton St. Apt. F-7, New York Mills, NY (US) 13417; Benjamin Lee Sitler, 111 Viburnum Ln, New Hartford, NY (US) 13413; Arthur James Hoffman, III, 2714 Bains Ct., Crofton, MD (US) 21114

( * ) Notice: Subject to any disclaimer, the term of this patent is extended or adjusted under 35 U.S.C. 154(b) by 0 days.

(21) Appl. No.: 11/034,358

(22) Filed: Jan. 13, 2005

(65) Prior Publication Data

US 2006/0153502 A1  Jul. 13, 2006

(51) Int. Cl.
G02B 6/36 (2006.01)
(52) U.S. Cl. .......................... 385/53; 385/78
(58) Field of Classification Search ............ 385/60–62, 385/65–72, 77–78, 81, 84–89, 92
See application file for complete search history.

(56) References Cited

U.S. PATENT DOCUMENTS

| | | | | |
|---|---|---|---|---|
| 4,185,883 A | * | 1/1980 | Chown et al. ................. | 385/84 |
| 4,325,607 A | * | 4/1982 | Carlsen ......................... | 385/70 |
| 4,743,084 A | * | 5/1988 | Manning ....................... | 385/84 |
| 5,040,867 A | | 8/1991 | De Jong et al. | |
| 5,241,613 A | * | 8/1993 | Li et al. ........................ | 385/78 |
| 5,285,510 A | * | 2/1994 | Slaney ......................... | 385/78 |
| 5,363,461 A | | 11/1994 | Bergmann | |
| 6,022,150 A | * | 2/2000 | Erdman et al. ................ | 385/81 |
| 6,325,549 B1 | * | 12/2001 | Shevchuk ..................... | 385/86 |
| 6,379,052 B1 | | 4/2002 | De Jong et al. | |
| 6,582,134 B2 | * | 6/2003 | Otera ........................... | 385/65 |
| 6,848,837 B2 | * | 2/2005 | Gilligan ....................... | 385/80 |
| 2003/0152333 A1 | * | 8/2003 | Gilligan ....................... | 385/80 |

* cited by examiner

*Primary Examiner*—Michelle Connelly-Cushwa
*Assistant Examiner*—Chris Chu
(74) *Attorney, Agent, or Firm*—David Giglio (57) ABSTRACT

There is provided an adapter that fits most standardized fiber optic cable connectors to allow quick field installations. The adapter includes a split diameter. The smaller diameter fits within a rear back shell of the connector and receives a fiber stub from the connector. The larger diameter abuts the rear of the rear back shell and receives an optical fiber. The adapter includes a pair of mated resilient members that forms a fiber guide within the adapter. The fiber stub and a bare optical fiber of the optical fiber are optically spliced within the fiber guide formed within the resilient members.

18 Claims, 6 Drawing Sheets

UNIVERSAL ADAPTER FOR FIBER OPTIC CONNECTORS

FIELD OF THE INVENTION

The present invention relates generally to the field of optical fiber connectors and, more particularly, to an adapter that allows for quick field installations of fiber optic cables to connectors.

BACKGROUND OF THE PRESENT INVENTION

Fiber optic connectors are used extensively in the telecommunications, data communications, CATV, medical, aerospace, military and sensor markets, to name a few.

These connectors are generally constructed by a threaded or bayonet-style coupling assembly with a metal, ceramic, plastic, glass or combination thereof, ferrule located at one end of the coupling assembly. This ferrule has a precision bored hole running axially through its center to accommodate the optical fiber.

The end of the ferrule that is mated to another connector is generally factory polished to very tight standards for surface end face finish, geometry, etc, or it is field polished, which yields surface geometries far less exact than obtainable by factory polishing.

One attempt to overcome field polishing is U.S. Pat. No. 5,363,461 to Bergmann which discloses a connector having a short factory polished stub that terminates within the connector. The optical fiber of the cable is inserted through the rear of the connector and mated with the stub fiber. The optical fiber is then glued in place. The problem with the connector in Bergmann is that the fiber optic cable must be glued, thereby creating a permanent installation.

Another attempt to improve the field of connectors is U.S. Pat. No. 5,040,867 to DeJong which provide a connector having a rear crimp tube and crimp ring. The unprotected optical fiber is inserted into the rear crimp tube for coupling with a connector stub fiber. The rear crimp tube is then crimped onto the unprotected optical fiber for a permanent installation. This crimping can easily damage the optical fiber.

One attempt to create a connector which allows for quick connect/disconnect of the fiber optic cable to the connector is U.S. Pat. No. 6,379,052 which uses a spring loaded splice plate within the connector to allow quick insertion, mating and then removal of a fiber optic cable to the connector. This connector has many parts and is expensive to produce. Further, the splice becomes unreliable and harder to maintain as the spring deforms over time. Finally, the splice plate damages bare fibers during repeated insertions and removals.

Although factory and field installation of fiber optic connectors, and the techniques for doing so, have advanced over the years, the techniques vary from connector type to connector type and from connector manufacturer to connector manufacturer. This becomes confusing for installers as they can be faced with the installation of a variety of connectors, which necessitates significant expenditures for installation tools, training, etc. for each of these different connectors.

OBJECTS AND SUMMARY OF THE PRESENT INVENTION

It is an object of the present invention to improve the art of fiber optic cable connectors.

It is another object of the present invention to improve the efficiency of field installing fiber optic cables to connectors.

It is a further object of the present invention to provide a method of installing a fiber optic cable to a connector in the field that can be quickly uninstalled and then reinstalled as required.

It is still another object of the present invention to provide a universal adapter that quickly mates with one of several field type connectors regardless of manufacture or style.

It is a feature of the present invention to provide a universal adapter that mates with a field type connector and receives a stub connector fiber and an optical cable fiber and quickly aligns the same.

It is still a further object of the present invention to provide such an adapter that does not damage bare fibers during repeated insertions and removal of the same.

It is also an object of this invention to provide such an adapter that does not require the replenishment of an optical matching grease, gel or adhesive at the optical interface to accommodate repeated insertions.

It is yet another feature of the present invention to provide an internal pigtail field connector for fiber optic cables.

It is still another feature of the present invention to provide an internal pigtail field connector that quickly mates with an optical fiber in a temporary fashion.

These and other objects and features of the present invention are provided by an adapter for a fiber optic cable connector, wherein the fiber optic cable connector includes a fiber stub and a rear back shell. The adapter has a split diameter housing having a smaller first diameter and a larger second diameter. The first and second diameters are axially aligned, and the first diameter is dimensioned to snugly fit within the rear back shell of the connector.

A first opening in the adapter receives the fiber stub. A second opening in the adapter receives a fiber optic cable, which includes a coated portion and a bare optical fiber. The adapter includes a mated pair of resilient members disposed therein. The resilient members form a fiber guide for receiving and aligning the stub fiber to the bare optical fiber.

The mated pair of resilient members includes a first member having a planar surface and a second member having a precision v-shaped groove extending longitudinally through a planar surface.

The first opening of the adapter includes a first opening bore sized to receive a coated portion of the fiber stub, and a beveled portion that extends from the first opening bore to a first end of the fiber guide. The beveled portion guides a bare portion of the stub fiber to the fiber guide.

The second opening of the adapter includes a second opening bore for receiving a coated portion or outer sheath of the fiber optic cable, and a beveled portion extends from the second opening bore to a second end of the fiber guide. The beveled portion guides the bare optical fiber to the fiber guide.

BRIEF DESCRIPTION OF THE DRAWINGS

The above and other objects of the present invention will be better understood by reading the following detailed description of the preferred embodiments of the invention, when considered in conjunction with the accompanying drawings, in which.

DETAILED DESCRIPTION OF THE PRESENT INVENTION

Fiber optic connectors usually consist of either an ST, SC, FC or LC type connector. In the field these types of connectors require known epoxy and polish techniques to prepare. The present invention provides for an adapter 10 that is sized to universally fit and adapt to one of the above described connectors, thus allowing for in-house preparation of connectors having a stub fiber. Thus, the need for heat ultraviolet-cured or cured epoxy and polish in the field is eliminated thereby decreasing training, equipment, material and installation costs.

Figure 1:
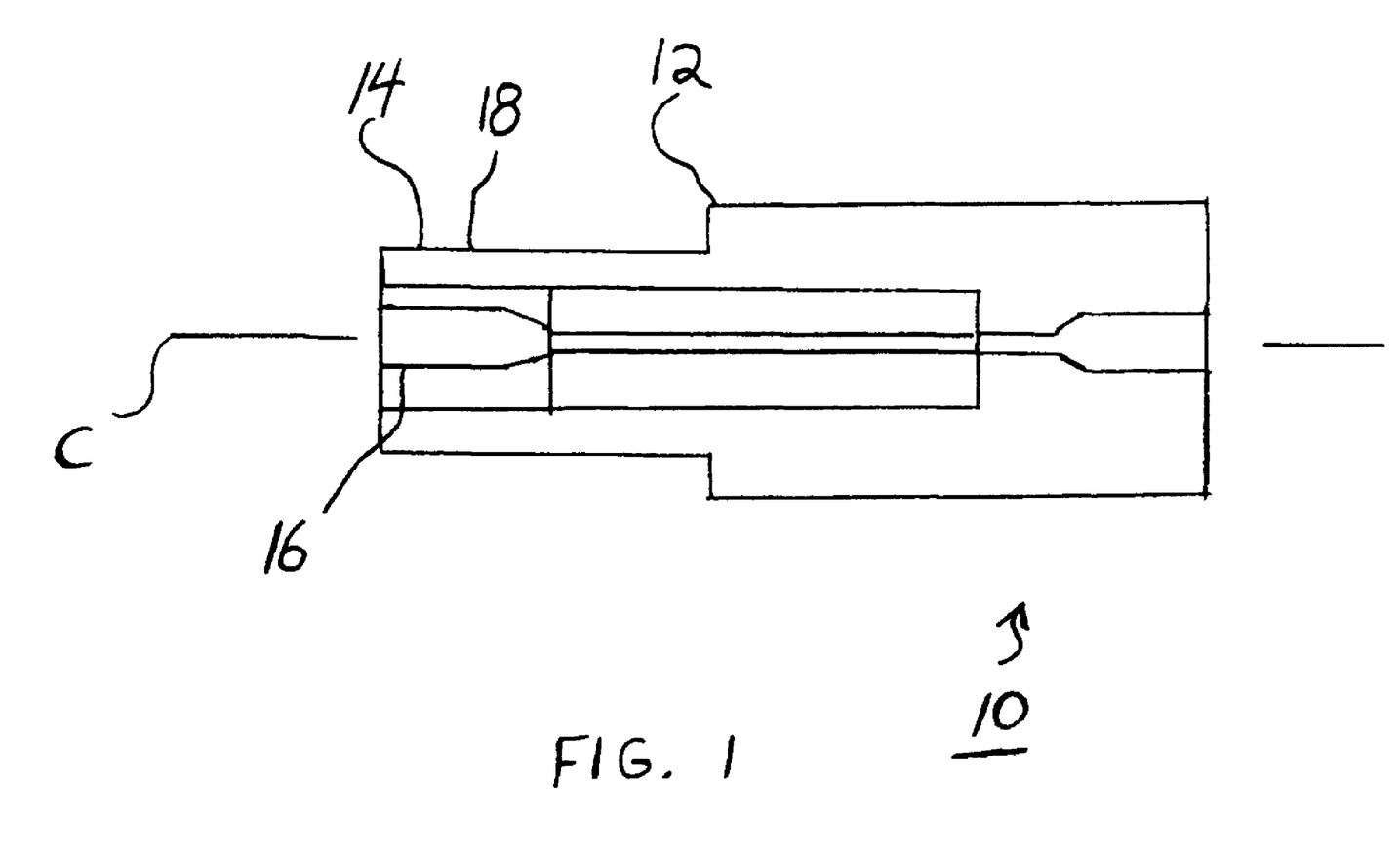
FIG. 1 is a side elevation view of a preferred embodiment of the adapter of the present invention.
Figure 2:
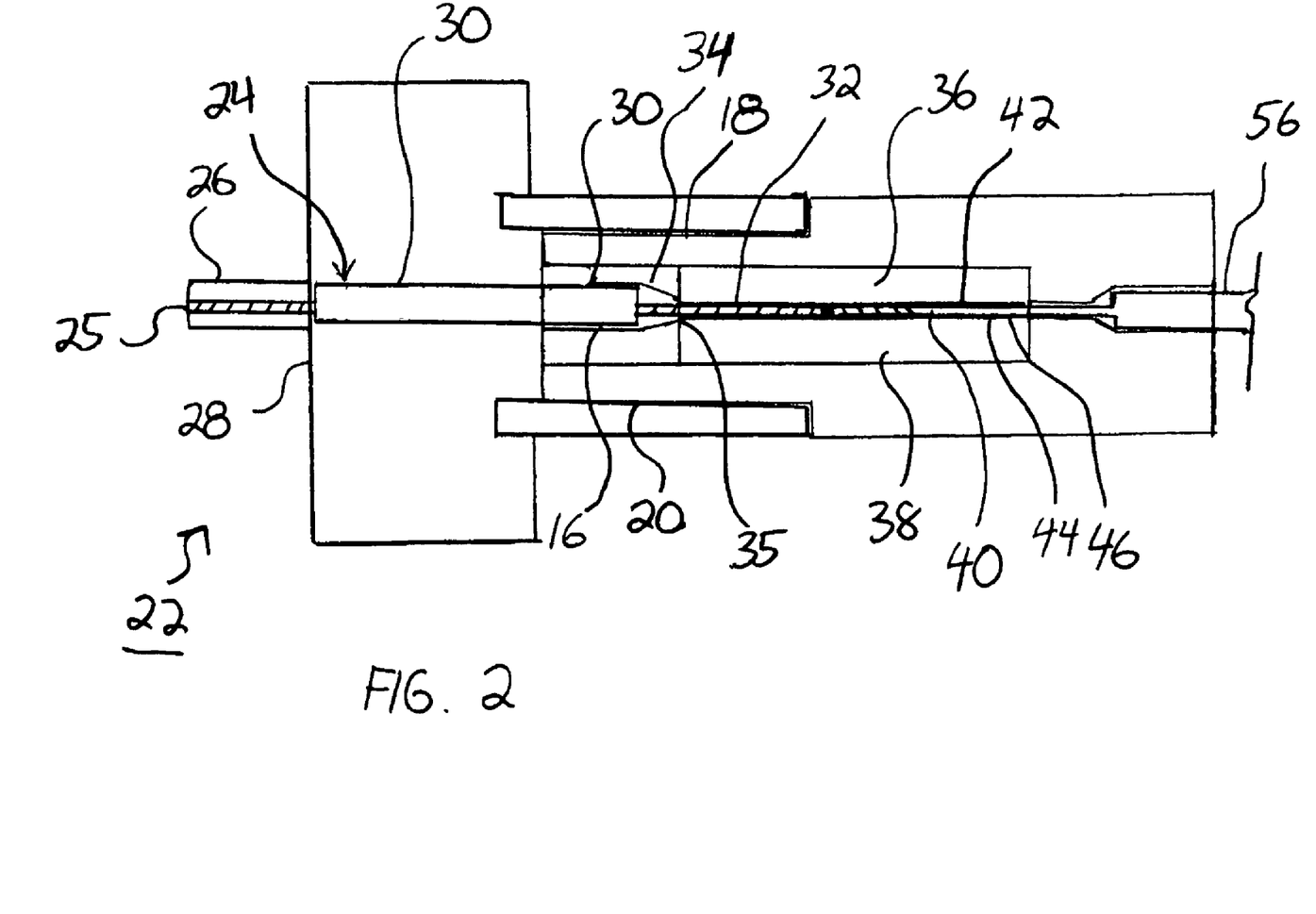
FIG. 2 is a side elevation view of the adapter of FIG. 1 in use with a connector and a fiber optic cable.

The present invention shall now be described in accordance with the accompanying drawings. Referring now to FIGS. 1 and 2, an adapter 10 of the present invention depicted exclusively in FIG. 1, is a split diameter housing 12 such that each of the diameters is axially aligned the centerline C. A first housing member 14 has a first diameter and may include an inwardly directed bore 16. An outer surface 18 of the first housing member 14 is sized to fit snugly inside of a rearward back shell 20 of a fiber optic connector 22, in which the fiber optic connector 22 is depicted in FIG. 2 in conjunction with the adapter 10 of FIG. 1.

The first housing member 14 can be permanently bonded within the rearward back shell 20 or temporarily fit within the rearward back shell 20 via a friction fit. The temporary fit provides easy connect/disconnect ability which is advantageous for many applications, such as when testing optical cables or active and passive fiber optic devices.

The first housing member 14 is designed to accommodate fiber stub 24 which is shown in FIG. 2. The fiber stub 24 includes a first polished end 25 that is coterminous with a ferrule 26 which extends from a connector housing 28. A coated portion 30 of the fiber stub 24 extends from the connector housing 28 into the inwardly directed bore 16. The coated portion 30 can be either an outer sheath of a fiber optic cable or it can also be a portion of the ferrule as it extends rearwardly through the connector housing 28.

A cleaved bare portion 32 of the fiber stub 24 becomes axially aligned with split diameter housing 12 as it passes through a beveled portion 34 of the first housing member 14. The beveled portion 34 terminates at a first opening 35 formed by a mating pair of elastomers 36, 38.

A mechanical elastomeric splice is described in U.S. Pat. No. 4,930,859 to Hoffman III, which is incorporated herein by reference.

The pair of mating elastomers 36, 38 form a fiber guide 40 within the adapter 10. The top elastomer 36 includes a substantially planar surface 42, while the bottom elastomer 38 includes a precision v-shaped notch 44 that extends longitudinally through another planar surface 46. The elastomers 36, 38 expand to allow the cleaved bare fiber 32 to pass therein without damaging or breaking the cleaved bare fiber 32, while at the same time firmly positioning the cleaved bare fiber 32 to be properly spliced with a bare optical fiber 48, depicted in FIG. 3.

Figure 3:
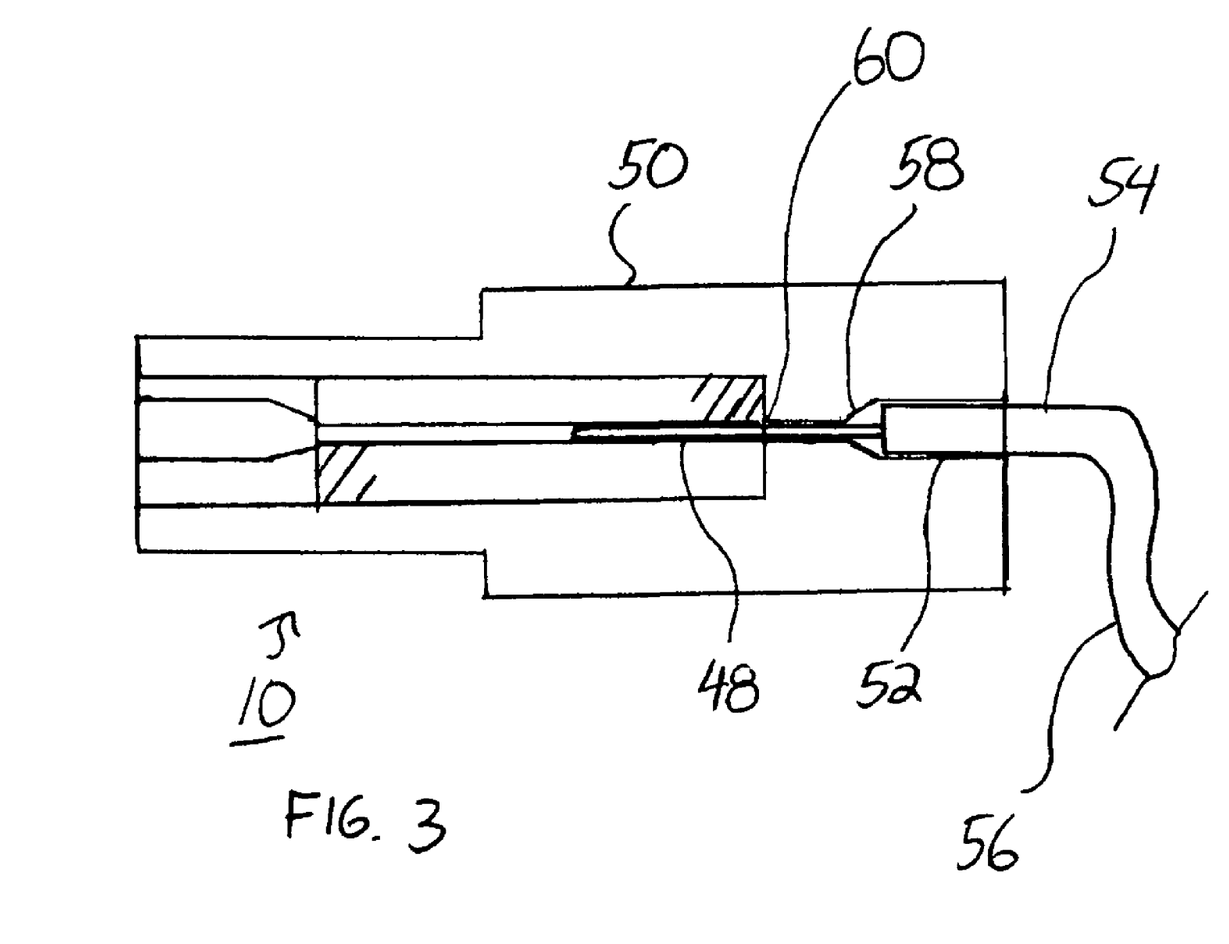
FIG. 3 is a side elevation view of an optical fiber in use with the adapter of FIG. 1.

Referring now to FIGS. 2 and 3, a second housing member 50 includes a larger diameter that abuts the rearward sleeve 20 when the first housing member 14 is installed therein. The second housing member includes an inwardly directed bore 52 that accommodates an outer coating 54 of an optical fiber 56. The outer coating 54 can be permanently bonded to the inwardly directed bore 52 via epoxy by compression clamping or by crimping methods. Optionally, a friction fit allows for easy connect/disconnect of the optical fiber 56 from the adapter 10.

The optical fiber 56 is field prepared by removing the outer sheath or coating and then cleaving the bare optical fiber 48.

A beveled portion 58 leads from the inwardly directed bore 52 to a second opening 60 of the fiber guide 40. Once again the beveled portion 58 guides and axially aligns a bare portion 48 of the optical fiber 56 so that it can be properly spliced to the fiber stub 24 within the fiber guide 40.

Once the bare optical cable 48 and the fiber stub 24 meet, the installer tunes the splice for optimal optical performance by simply rotating and/or moving the adapter 10 in and out. A boot (not shown) fits neatly over the split diameter housing 12 and the rear back shell 20 to provide protection.

Figure 4:
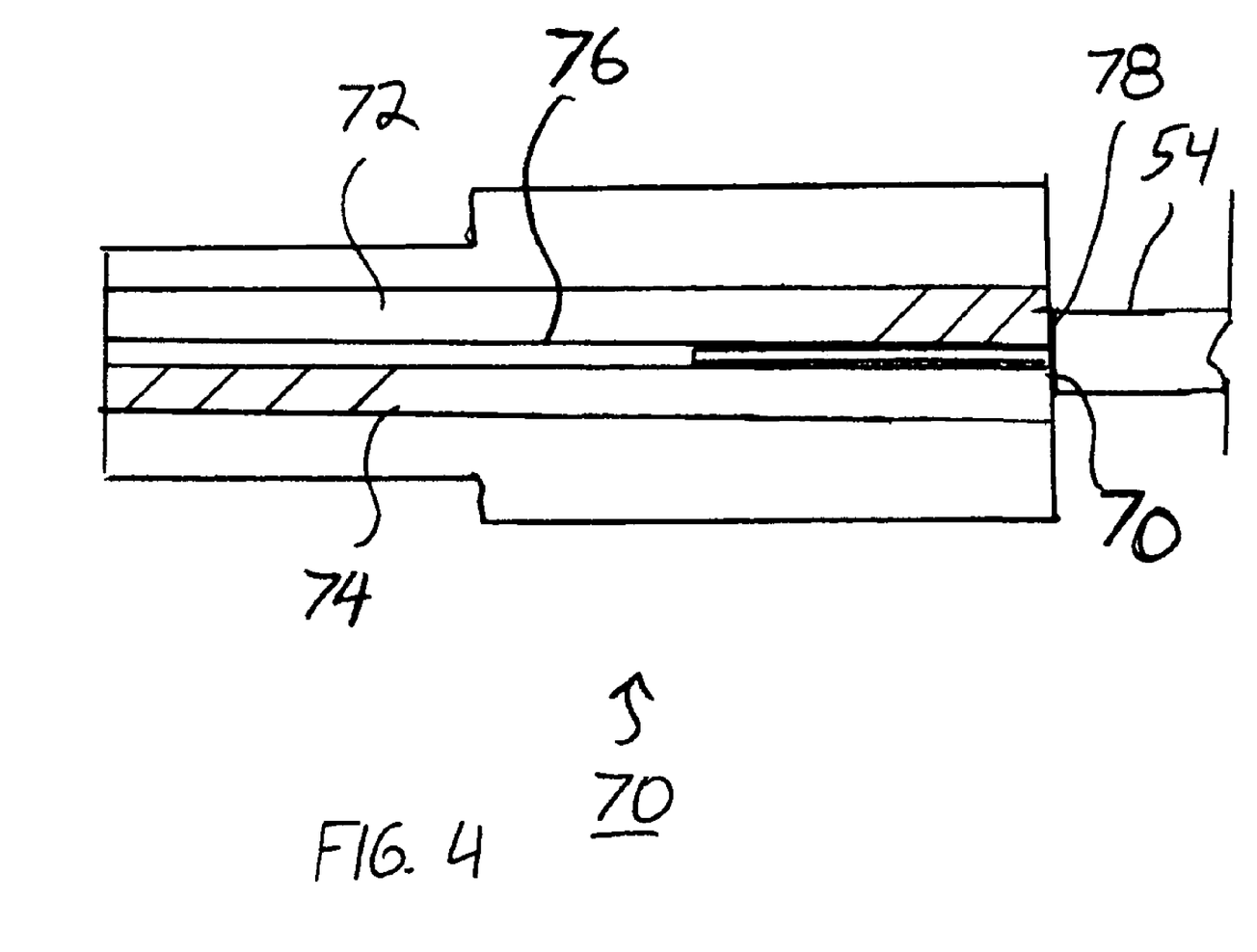
FIG. 4 is a side elevation view of an alternative embodiment of an adapter of the present invention.
Figure 5:
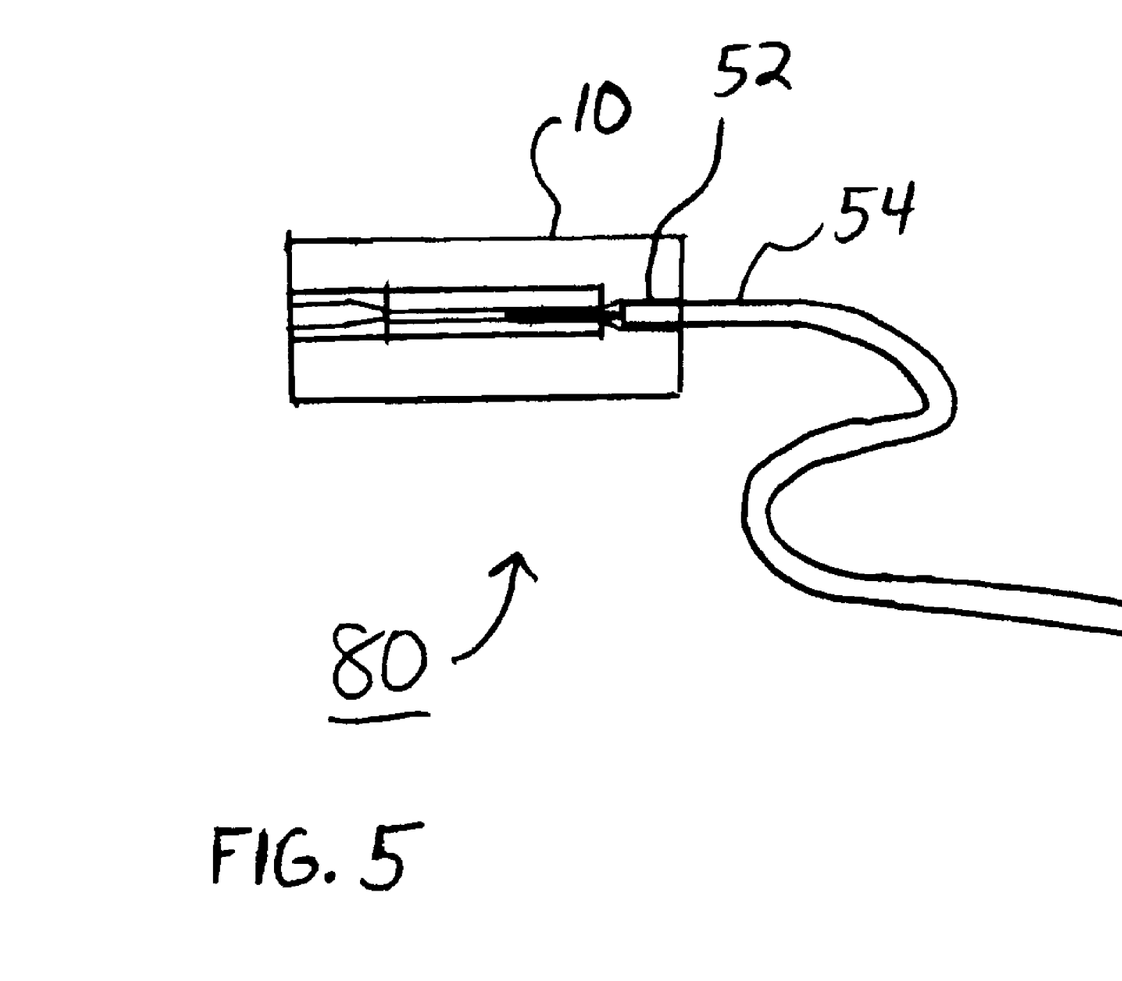
FIG. 5 is a side elevation view of a preferred embodiment of an optical fiber in accordance with the present invention.

Turning now to FIGS. 4 and 5, an alternative embodiment of an adapter 70 in accordance with the present invention includes a mating pair of elastomers 72, 74 that extend the length of the adapter 70. The mating pair of elastomers form a fiber guide 76 as previously described herein. Without having any inwardly directed bores within the adapter 70, the bare portion 32 of the stub fiber 24 and the bare optical fiber 48 of the fiber optic cable 56 are directly inserted into the fiber guide 76 for splicing.

For a permanent bond, the coated portion 30 of the stub fiber 24 or the end 78 of the outer coating 54 of the optical fiber 56 are bonded to an end of the adapter 70 through the use of a fast curing adhesive, such as a light-cured, ultraviolet cured adhesive or anaerobic adhesive, or a compressive (clamping) mechanism. A cable boot (not shown) slides over the glued end 78 to provide protective outer covering.

In some applications it is desirous that a fiber optic cable 80 have a permanent termination with the adapter 10 of the present invention. This optical fiber 80 depicted in FIG. 5 is advantageous in testing applications as it can be readily connected/disconnected between a number of connectors (not shown).

Should a permanent connection be desired, the fibers optic cable 56 can be bonded to the adapter 10 through the use of a fast curing adhesive, such as a light-cured, ultraviolet cured adhesive or anaerobic adhesive. Should a semi-permanent connection be desired, a resilient clamp may be either threaded or snapped over the optical fiber 56 and onto the outer surface of the adapter 10. In cases where the optical fiber 48 is in a strengthened cable, the strength member, typically an aramid yarn, can be terminated to the outside of the sleeve or the clamp using a crimp sleeve.

Figure 6:
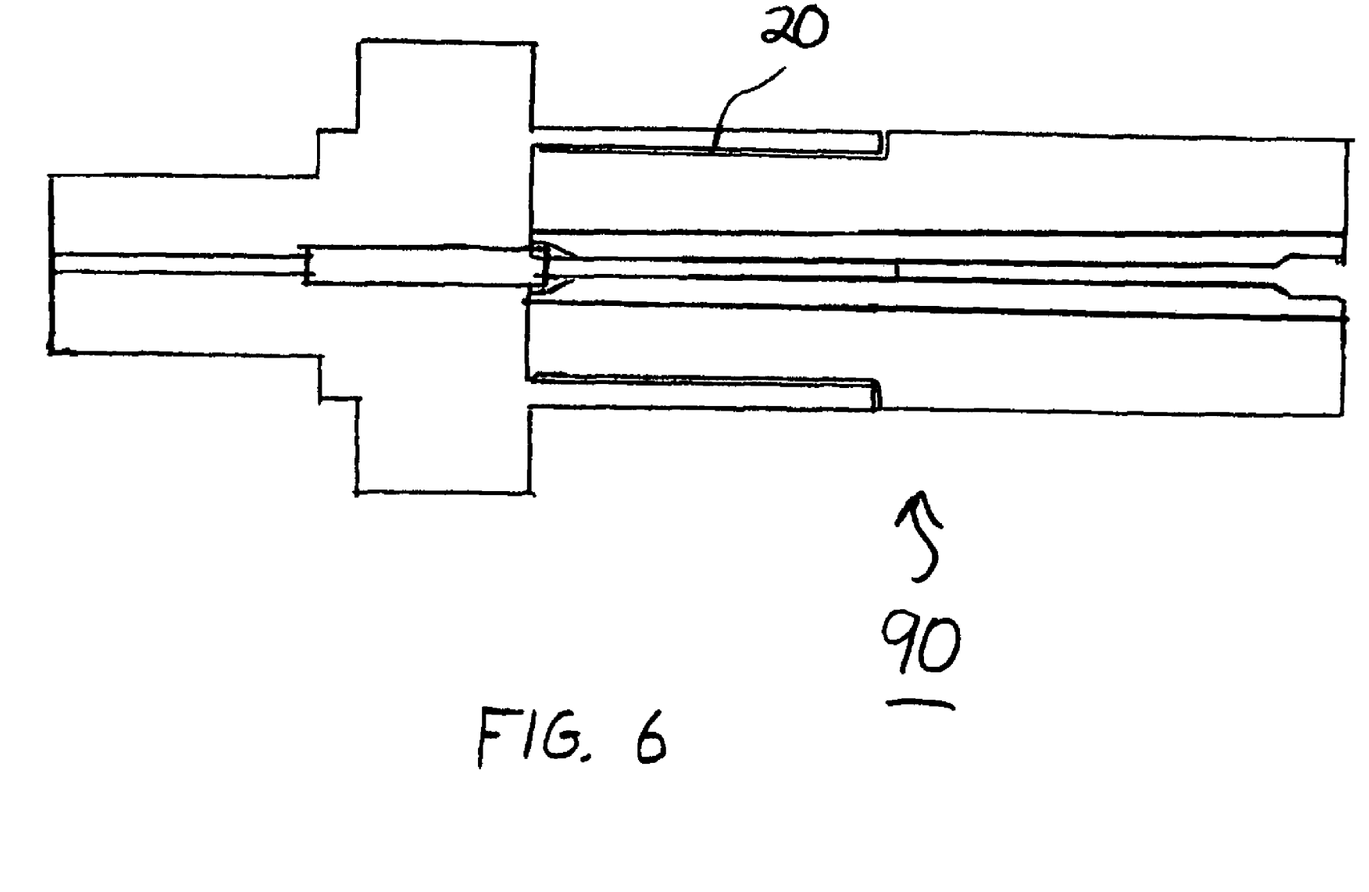
FIG. 6 is a side elevation view of a preferred embodiment of a fiber optic connector in accordance with present invention.

Turning now to FIG. 6, a cable connector 90 readily includes the adapter 10 for quick installation. The cable connector 90 is manufactured in-house with fiber stub 24 having one polished end and one cleaved end. The optical fiber 56 is quickly cleaved in the field and installed in the adapter 10 for a quick field splice.

Various changes and modifications, other than those described above in the preferred embodiment of the invention described herein will be apparent to those skilled in the art. While the invention has been described with respect to certain preferred embodiments and exemplifications, it is not intended to limit the scope of the invention thereby, but solely by the claims appended hereto.

What is claimed is:

1. An adapter for a fiber optic cable connector, wherein said fiber optic cable connector includes a fiber stub, wherein said fiber stub includes a predetermined length of bare fiber extending rearward, and a rear back shell, said adapter comprising:
    a one piece split diameter housing having a smaller first diameter and a larger second diameter, wherein said first and second diameters are axially aligned, and wherein said first diameter is dimensioned to snugly fit within said rear back shell;
    a first opening disposed at a first end of said split diameter housing which receives the entire predetermined length of said rearward extending bare cable;
    a second opening disposed at a second end of said split diameter housing for receiving an optical fiber, wherein said fiber optical cable includes a coated portion and a bare portion; and
    a mated pair of resilient members disposed within said split diameter housing, said resilient members forming a fiber guide for receiving and aligning the stub fiber to the optical fiber.

2. The adapter of claim 1, wherein said mated pair of resilient members include a first member having a planar surface and a second member having a v-shaped groove extending longitudinally through a planar surface.

3. The adapter of claim 1, wherein said fiber stub further includes a rearward extending coated portion and wherein said first opening includes a first opening bore sized to receive the coated portion of said fiber stub, and a beveled portion that extends from said first opening bore to a first end of said fiber guide, said beveled portion for guiding a cleaved bare portion of the stub fiber to the fiber guide.

4. The adapter of claim 1, wherein said second opening includes a second opening bore for receiving a coated portion of said optical fiber, and a beveled portion that extends from said second opening bore to a second end of said fiber guide, said beveled portion for guiding the cleaved bare portion of the optical fiber to the fiber guide.

5. The adapter of claim 1, wherein said first opening is coterminous with a first end of said fiber guide.

6. The adapter of claim 1, wherein said second opening is coterminous with a second end of said fiber guide.

7. A fiber optic cable comprising:
    at least one optical fiber;
    a cladding axially aligned with and radially extending from said at least one optical fiber;
    a buffer layer axially aligned with and radially extending from said cladding;
    at least one strength member running the length of the cable;
    an outer sheath radially extending from said buffer layer and said at least one strength member; and
    an adapter for receiving an end of the at least one optical fiber, wherein said adapter comprises,
        a one piece split diameter housing having a smaller first diameter and a larger second diameter, wherein said first and second diameters are axially aligned, and wherein said first diameter is dimensioned to snugly fit within a rear back shell of a fiber optic connector;
        a first opening disposed at a first end of said split diameter housing for receiving a fiber stub of the fiber optic connector, wherein said fiber stub includes a predetermined length of bare fiber extending rearward, and wherein said first opening receives the entire predetermined length of said rearward extending bare cable;
        a second opening disposed at a second end of said split diameter housing for receiving the at least one optical fiber; and
        a mated pair of resilient members disposed within said split diameter housing, said resilient members forming a fiber guide for receiving and aligning the stub fiber to the fiber optic cable fiber.

8. The adapter of claim 7, wherein said mated pair of resilient members include a first member having a planar surface and a second member having a v-shaped groove extending longitudinally through a planar surface.

9. The adapter of claim 7, wherein said fiber stub further includes a rearward extending coated portion and wherein said first opening includes a first opening bore for receiving the coated portion of the fiber stub, and a beveled portion that extends from said first opening bore to a first end of said fiber guide, said beveled portion for guiding a cleaved bare portion of the stub fiber to the fiber guide.

10. The adapter of claim 7, wherein said second opening includes
    a second opening bore for receiving the outer sheath of said optical fiber, and a beveled portion that extends from said second opening bore to a second end of said fiber guide, said beveled portion for guiding the optical fiber to the fiber guide.

11. The adapter of claim 7, wherein said first opening is coterminous with a first end of said cable guide for receiving the bare portion of the fiber stub.

12. The adapter of claim 7, wherein said second opening is coterminous with a second end of said cable guide for receiving the optical fiber.

13. A fiber optic cable connector comprising:
    a connector housing;
    a ferrule extending from a first end of said connector housing;
    a stub optical fiber having a first end coterminous with a first end of said ferrule and extending rearwardly through the connector housing;
    a back shell rearwardly disposed from said connector housing; and
    a fiber optical cable adapter comprising,
        a one piece split diameter housing having a smaller first diameter and a larger second diameter, wherein said first and second diameters are axially aligned, and wherein said first diameter is dimensioned to snugly fit within said back shell, and wherein a frontal end of said larger second diameter contiguously extends from a rear end of said first diameter, and wherein said frontal end of said larger second diameter is rearwardly disposed to a rearward end of said backshell;
        a first opening disposed at a first end of said split diameter housing for receiving said fiber stub;
        a second opening disposed at a second end of said split diameter housing for receiving an optical fiber, wherein said optical fiber includes a coated portion and a bare portion; and
        a mated pair of resilient members disposed within said split diameter housing, said resilient members forming a fiber guide for receiving and aligning the stub fiber to the bare portion of the optical fiber, wherein a second end of said stub fiber is disposed within said resilient member.

14. The adapter of claim 13, wherein said mated pair of resilient members include a first member having a planar surface and a second member having a v-shaped groove extending longitudinally through a planar surface.

15. The adapter of claim 13, wherein said first opening includes a first opening bore for receiving a coated portion of the fiber stub, and a beveled portion that extends from said first opening bore to a first end of said fiber guide, said beveled portion for guiding a cleaved bare portion of the stub fiber to the fiber guide.

16. The adapter of claim 13, wherein said second opening includes
a second opening bore for receiving a coated portion of said optical fiber, and a beveled portion that extends from said second opening bore to said fiber guide, said beveled portion for guiding the cleaved bare portion of the optical fiber to the fiber guide.

17. The adapter of claim 13, wherein said first opening is coterminous with a first end of said fiber guide.

18. The adapter of claim 13, wherein said second opening is coterminous with a second end of said fiber guide.

\* \* \* \* \*